V. E. FRANKLIN.
LAND MARKER.
APPLICATION FILED AUG. 4, 1913.
1,092,346.
Patented Apr. 7, 1914.
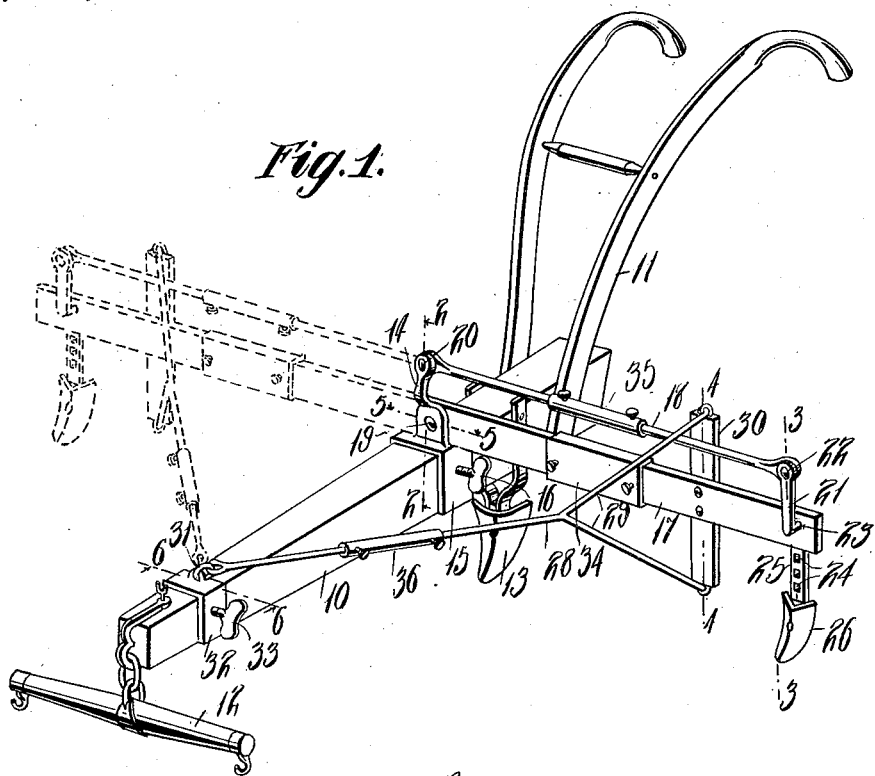

UNITED STATES PATENT OFFICE.

VIRGIL E. FRANKLIN, OF GRAYMONT, GEORGIA.

LAND-MARKER.

1,092,346.    Specification of Letters Patent.    Patented Apr. 7, 1914.

Application filed August 4, 1913. Serial No. 782,899.

*To all whom it may concern:*

Be it known that I, VIRGIL E. FRANKLIN, a citizen of the United States, residing at Graymont, in the county of Emanuel, State of Georgia, have invented certain new and useful Improvements in Land-Markers; and I do hereby declare the following to be a full, clear, and exact description of the invention, such as will enable others skilled in the art to which it appertains to make and use the same.

This invention relates to markers and has for an object to provide a simple but effective marker for use in connection with plows and adapted to be swung to operative position on either side of the plow, and when so swung the marking shoe will be always in operative position.

A further object is to provide a marker including normally parallel arms that are pivotally connected at the inner ends to a bracket one above the other, and are pivotally connected at their outer ends by a crank to which the marking shoe is connected, the crank being actuated by swinging of the arms to operative position and serving to position the shoe in operative position.

A further object is to provide a device of this character that will be formed of a few simple and inexpensive parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a perspective view of a plow equipped with my improved marker. Fig. 2 is a fragmentary vertical sectional view on the line 2—2 Fig. 1. Fig. 3 is a fragmentary vertical sectional view on the line 3—3 Fig. 1. Fig. 4 is a fragmentary vertical sectional view on the line 4—4 Fig. 1. Fig. 5 is a fragmentary sectional view on the line 5—5 Fig. 1. Fig. 6 is a fragmentary sectional view on the line 6—6 Fig. 1.

Referring now to the drawing in which like characters of reference designate similar parts, 10 designates the plow beam having the usual handles 11 and draft attachment 12, and carrying the usual plow 13.

In carrying out my invention I provide an upright bracket 14 having an inverted U-shaped attaching foot 15 designed to be disposed astride of the plow beam and the legs anchored to the sides of the latter by thumb screws 16 or otherwise. A pair of parallel arms 17 and 18 are pivoted upon superposed corresponding pivots 19 and 20 carried by the bracket 14. A rightangular crank arm 21 has the upright leg pivoted by means of a pivot pin 22 to the outer end of the upper arm, and has the horizontal legs passed through an opening 23 in the outer end of the lower arm and there squared to be engaged selectively in any one of a series of square openings 24 in the shank 25 of a marking foot 26, a nut 27 being threaded on to the end of the arm to secure the shank in place.

When both arms are rocked from the position shown in full lines in Fig. 1 upwardly to the position shown in dotted lines in this figure, the crank arm will be so actuated that it moves from the operative position shown in full lines to the operative position shown in dotted lines and thus will always be disposed in operative position when the marker arms are swung to either side of the plow beam.

A brace 28 is provided at the rear end with a fork 29 the branches of which straddle both of the arms 17 and 18 and are terminally connected to a vertical cross arm 30 that is centrally secured near the outer end of the lower arm 17. The brace is connected at the front end as at 31 to an inverted U-shaped bracket 32 which is positioned astride of the beam 10 near the front end of the latter and is secured in place by thumb screws 33 or otherwise, this brace swinging with the marker arms to either side of the beam, and serving to reinforce the marker arms against displacement.

In order that the device may be adapted to be readily adjusted to mark rows of different widths, the upper arm 18, lower arm 17, and brace 28 are all made extensible, preferably by forming each member of two parts adjustably bolted together as shown respectively at 34, 35 and 36.

By reason of the constant parallelism of the standards of the plow and the marker, the plow and the marker are themselves in constant spaced relation and equal spacing of the furrows is thereby assured. This constant parallelism is effected through the parallel connections including the parts 14, 21, 17 and 18′.

From the above description it will be seen that I have provided an extremely simple and inexpensive marker arm that will effectively operate under various conditions of service and will be formed of a few simple parts that will not easily get out of order.

What is claimed, is:—

1. The combination with a plow beam, including parallel marker arms pivoted on superposed pivots carried by said beam, a crank pivotally connected to the upper arm and having one leg engaged through an opening in the lower arm, and a marker shoe fixed to said leg, said arms being adapted to be rotated into horizontal position upon either side of said beam, said crank serving during such rotation to rotate said marker shoe to operative position.

2. The combination with a plow beam of a bracket thereon, a pair of parallel marker arms pivoted on superposed pivots carried by said bracket, a crank pivotally connected to the outer end of the upper arm and having one leg engaged through an opening in the outer end of the lower arm, a marker shoe fixed to said leg, rotation of said arms to either side of said beam serving to actuate said crank whereby said shoe is rotated to operative position, and a brace pivotally connected to said beam in advance of said bracket and connected at the rear end to one of said arms.

In testimony whereof, I affix my signature, in the presence of two witnesses.

VIRGIL E. FRANKLIN.

Witnesses:
J. C. BLACKWELL,
H. WINN.

---

Copies of this patent may be obtained for five cents each, by addressing the "Commissioner of Patents, Washington, D. C."